Oct. 5, 1948.　　　　C. A. THOMAS　　　　2,450,698
BRUSH FOR DYNAMOELECTRIC MACHINES
Filed June 26, 1947

Inventor:
Charles A. Thomas,
by Rowell S. Mack
His Attorney.

Patented Oct. 5, 1948

2,450,698

UNITED STATES PATENT OFFICE 2,450,698

BRUSH FOR DYNAMOELECTRIC MACHINES

Charles A. Thomas, Fort Wayne, Ind., assignor to General Electric Company, a corporation of New York Application June 26, 1947, Serial No. 757,080

3 Claims. (Cl. 171—228)

This invention relates to commutator brushes for dynamoelectric machines.

In the design of commutating type dynamoelectric machines, one of the problems encountered has been the limitation of the short-circuit current in the brushes caused by the short-circuiting of the armature windings during commutation. The elimination of these short-circuit currents has been accomplished by such methods as the proper proportion of armature windings and slots, proper airgap, provision for compensating windings and interpoles, and various brush constructions.

It is an object of this invention to provide an improved brush construction for a commutating type dynamoelectric machine which will effectively limit the short-circuit current in the brush.

Further objects and advantages of this invention will become apparent and the invention will be better understood from the following description referring to the accompanying drawing, and the features of novelty which characterize this invention will be pointed out with particularity in the claims annexed to and forming part of this specification.

A feature of this invention is the provision of a brush having a plurality of segments of conventional carbonaceous material with rectifying means interconnecting the segments in such a manner that current can pass through the brush in one direction only. In this way, the passage of the short-circuit current due to the commutation voltage between the brush segments is effectively limited.

Figure 1:
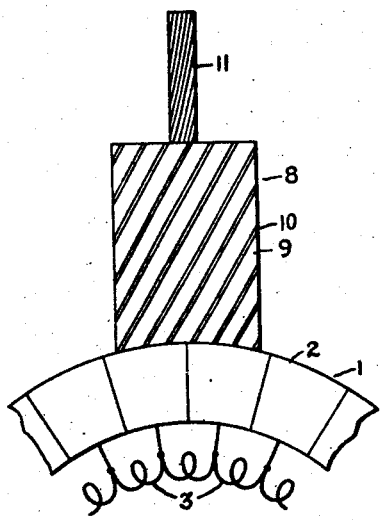
Figure 2:
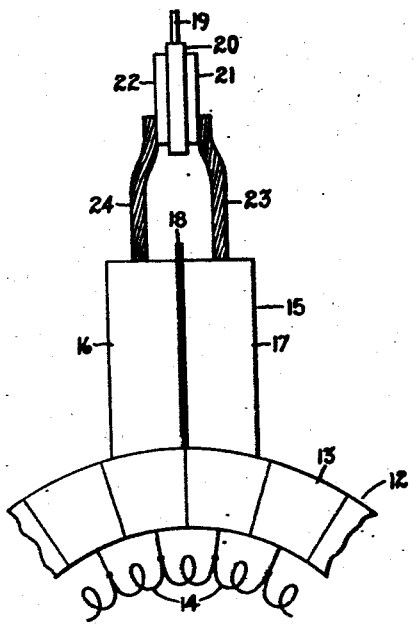
Figure 3:
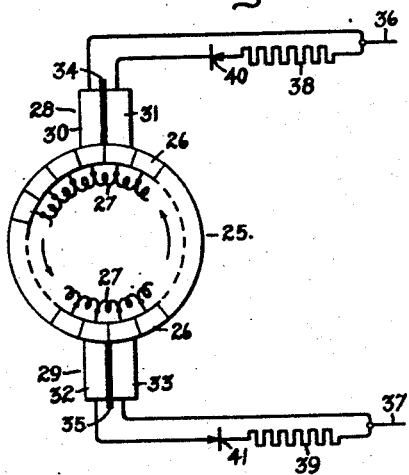
Figure 4:
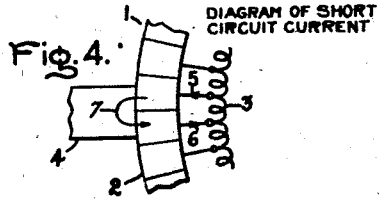

In the drawing, Fig. 1 illustrates one embodiment of a brush incorporating the improved construction of this invention. Fig. 2 illustrates another embodiment of this invention utilizing an external rectifier. The preferred embodiment of this invention is shown in Fig. 3. Fig. 4 is a diagram to explain the manner in which a conventional brush short-circuits the armature windings during commutation to produce the objectionable short-circuit.

A commutating type dynamoelectric machine is usually constructed, as shown in Fig. 4, with a rotatable armature 1 having a commutator formed of segments 2 to which are connected the armature windings 3. Stationary brushes 4 collect current from ore connect voltage to the commutator and armature windings. It can readily be seen that the use of a conventional brush formed of a solid block of carbonaceous material, on rotation of the armature 1, causes the armature windings 3 to be successively short-circuited by the brush 4 causing current to flow as indicated by the arrows 5, 6 and 7. These local currents which are produced by the voltage of commutation in the coils momentarily short-circuited by the brushes are of high value although of low voltage. While these currents are only temporary in nature, they form and disappear in rapid succession producing objectionable heat and reducing efficiency by consuming power. In addition, since the contacts with the coils are constantly being made and broken as the commutator revolves, there is a resultant succession of sparks which produces undesirable pitting of the commutator and shortens brush life.

Referring now to Fig. 1 in which armature 1 of a commutating type dynamoelectric machine is provided with commutator segments 2 and armature windings 3, there is shown a brush 8 formed of alternate parallel segments of layers of carbonaceous material 9 and a rectifying material 10 abutting the commutator segments 2. Brush lead or pig-tail 11 is provided to connect the brush in the circuit of the machine (not shown). These layers of rectifying material may be of any dry, contact type such as copper-oxide and are arranged to pass current through the brush in one direction only. In the complete machine, one brush is designated to pass current from the commutator and the companion brush is designed to pass current returning to the commutator.

It will now be readily apparent that the short-circuit currents ordinarily produced by a solid block brush, as shown in Fig. 4, will not be produced in this construction, since the provision of the rectifying material 10 effectively prohibits the passage of the short-circuit current from one side to the other side of the armature winding short-circuited by the brush and merely permits the passage of load current through the brush in one direction only to the rest of the machine.

Referring now to Fig. 2, there is shown a dynamoelectric machine armature 12 provided with a commutator having segments 13 and armature windings 14. Brush 15 is provided with individual half-segments 16 and 17 separated by insulation 18. Brush lead 19 is provided for connecting the brush to the circuit of the machine (not shown). The brush lead is connected to the segments 16 and 17 through a dry, contact rectifier having a plate 20 and contact elements 21 and 22 connected to segments 16 and 17 by wires 23 and 24. This rectifier may be of any conventional dry, contact type such as a copper-oxide or copper sulphide-magnesium. It will be readily understood that the short-circuit condition shown in Fig. 4 cannot occur with this form of construction since the provision of the rectifier unit allows the passage of load current through both sections of the brush to the brush lead in one direction only and effectively prevents the passage of current between the brush segments to establish the short-circuit current.

Referring now to Fig. 3, there is shown the preferred embodiment of this invention in which armature 25 of a dynamoelectric machine is provided with a commutator having segments 26 and armature windings 27. Brushes 28 and 29 are each formed of two segments 30, 31 and 32, 33 respectively. These brush segments are respectively insulated by insulation 34 and 35. The trailing brush segments 30 and 32 are respectively connected directly to brush leads 36 and 37 while the leading brush segments 31 and 33 are connected to the brush leads by series resistors 38 and 39 and rectifiers 40 and 41. These rectifiers are of the conventional dry, contact type such as copper-oxide.

It can now be readily seen that the provision of the rectifiers 40 and 41 effectively prevents the passage of the short-circuit current brush segments. In addition, the resistors 38 and 39 are of such value that the load current is equally divided between the two halves of the brushes. This also aids in the suppression of the short-circuit current since it prevents a voltage differential between the brush segments which causes the short-circuit current.

It can now be readily apparent that the improved brush construction described above will increase the efficiency of direct current motors and generators by the elimination of the short-circuit current due to commutating voltage. Also, this construction in certain designs will permit the omission of interpoles. Commutator machines without interpoles can be constructed in reduced sizes since smaller brushes and commutators can be utilized due to the fact that brush material having a lower drop can be used which in turn allows a larger current capacity for the same size brush. In addition, by the use of this improved brush construction, it is possible to equalize the current density in the brush segments allowing a further reduction in brush size. This arrangement provides an effective method of suppressing radio interference noise due to commutation in commutating machines and lengthens brush and commutator life due to the reduction in sparking.

By having extra brushes of this type for exciting the field, a shunt or compound motor can be operated from an alternating current supply. A series motor can, of course, be operated on alternating current without the extra brushes. Conversely, an alternating current generator equipment with such brushes on a slip ring would produce half-wave rectifier current.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A brush for dynamoelectric machines having a plurality of segments of conductive material, and a plurality of layers of rectifying material interspaced between said segments for passing current through said brush in only one direction whereby the short-circuit current under said brush is limited.

2. A brush for dynamoelectric machines having alternate parallel layers of conductive material and rectifying material whereby current will flow in only one direction through said brush.

3. A brush for dynamoelectric machines having a plurality of parallel layers of carbonaceous material abutting the commutator of said dynamoelectric machine, and a plurality of layers of rectifying material of the copper-oxide type interspaced between said layers of carbonaceous material for passing current through said brush in only one direction whereby short-circuit current under such brush is limited.

CHARLES A. THOMAS.

REFERENCES CITED

The following references are of record in the file of this patent:

UNITED STATES PATENTS

| Number | Name | Date |
| --- | --- | --- |
| 730,523 | Dow | June 9, 1903 |
| 781,805 | Bodde | Feb. 7, 1905 |
| 1,470,428 | Dorsey | Oct. 9, 1923 |
| 1,884,021 | Ludwig et al. | Oct. 25, 1932 |

FOREIGN PATENTS

| Number | Country | Date |
| --- | --- | --- |
| 628,774 | France | July 5, 1927 |